(12) United States Patent
Obendiek

(10) Patent No.: US 7,004,531 B2
(45) Date of Patent: Feb. 28, 2006

(54) TOP FOR A CONVERTIBLE VEHICLE

(75) Inventor: Klaus Obendiek, Passau (DE)

(73) Assignee: Edscha Cabrio-Dachsysteme GmbH, Hengersberg (DE)

( * ) Notice: Subject to any disclaimer, the term of this patent is extended or adjusted under 35 U.S.C. 154(b) by 71 days.

(21) Appl. No.: 10/650,576

(22) Filed: Aug. 28, 2003

(65) Prior Publication Data

US 2005/0029833 A1    Feb. 10, 2005

(30) Foreign Application Priority Data

Aug. 30, 2002  (DE) ............................ 102 40 759

(51) Int. Cl.
*B60J 7/00* (2006.01)

(52) U.S. Cl. ............ 296/108; 296/107.06; 296/107.17

(58) Field of Classification Search ............... 296/108,
296/107.01, 107.05, 107.06, 107.16, 107.17,
296/107.19, 107.2, 121, 135, 214, 114, 115,
296/116, 117, 107.15

See application file for complete search history.

(56) References Cited

U.S. PATENT DOCUMENTS

| | | | | |
|---|---|---|---|---|
| 4,964,668 A | * | 10/1990 | Hofmann ............... | 296/107.06 |
| 5,246,262 A | * | 9/1993 | Schrader et al. ........... | 296/108 |
| 5,490,709 A | * | 2/1996 | Rahn ......................... | 296/108 |
| 5,803,534 A | * | 9/1998 | Murkett et al. ............. | 296/215 |
| 5,979,970 A | * | 11/1999 | Rothe et al. ........... | 296/107.17 |
| 6,019,416 A | * | 2/2000 | Beierl .................... | 296/107.17 |
| 6,036,259 A | * | 3/2000 | Hertel et al. ........... | 296/216.01 |
| 6,053,568 A | * | 4/2000 | Jambor ....................... | 296/213 |
| 6,139,086 A | * | 10/2000 | Fischer .................... | 296/107.01 |
| 6,698,826 B1 | * | 3/2004 | Doll et al. ............. | 296/216.08 |
| 2002/0171265 A1 | * | 11/2002 | Armbruster ............ | 296/216.04 |

FOREIGN PATENT DOCUMENTS

| | | | | |
|---|---|---|---|---|
| DE | 4031270 | | 10/1991 | |
| DE | 4316485 | * | 11/1994 | ................. 296/108 |
| DE | 44 03 175 | | 3/1995 | |
| DE | 199 46 926 | | 10/2000 | |
| EP | 246201 | * | 11/1987 | ............ 296/107.07 |
| EP | 1 384 610 | | 1/2004 | |
| JP | 362026118 | * | 2/1987 | ............ 296/107.09 |
| JP | 402306822 | * | 12/1990 | ................. 296/108 |

* cited by examiner

*Primary Examiner*—H. Gutman
(74) *Attorney, Agent, or Firm*—Davidson, Davidson & Kappel, LLC

(57) ABSTRACT

A top for a convertible vehicle includes a rigid moveable roof part with an outer surface and an inner surface, a linkage moveable relative to the roof part during an opening movement of the convertible top, and a cover including a flexible sheet-like element. The linkage is disposed between the outer surface of the roof part and the cover in a closed state of the convertible top. The cover is moveable away from the roof part during the opening movement of the convertible top so as to form a space for the linkage.

14 Claims, 7 Drawing Sheets

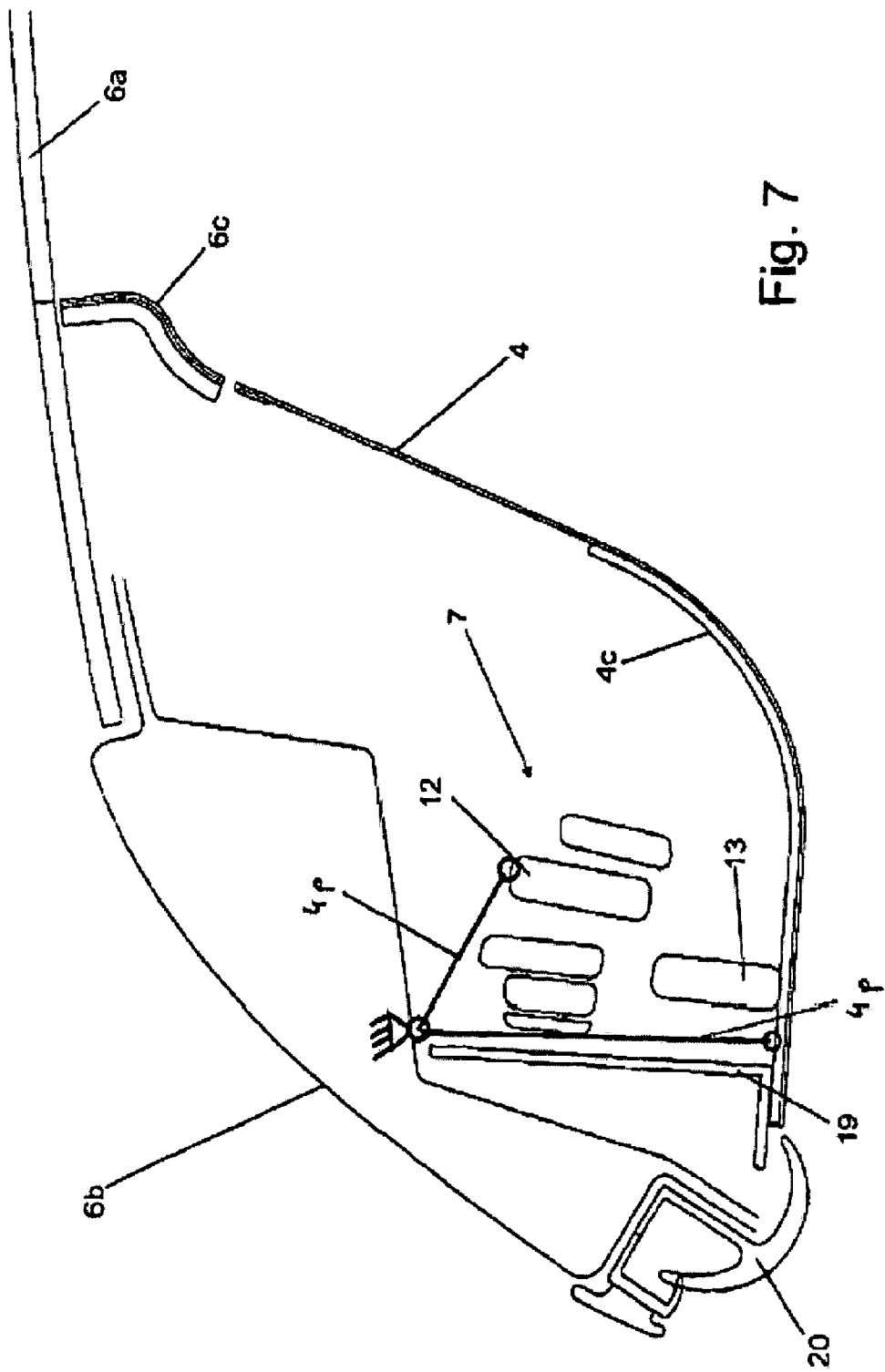

TOP FOR A CONVERTIBLE VEHICLE

Priority is claimed to German Patent Application DE 102 40 759.2-21, filed Aug. 30, 2003.

BACKGROUND INFORMATION

The invention relates to a top for a convertible vehicle, comprising a rigid, moveable roof part with an outer surface and an inner surface, a linkage, it being possible for the linkage to be moved in relation to the roof part during an opening movement of the convertible top, and a cover which is designed as a flexible, sheet-like element.

A basic problem with the construction of such modern tops for convertible is vehicles, which usually comprise a plurality of roof parts designed as rigid shell parts, is that the linkage parts which pivot the roof parts are moved relative to the roof parts during an opening movement of the convertible top, with the result that it is not possible to provide a continuous inside roof lining to cover over the linkage parts in the closed state of the convertible top. It is therefore generally the case that the linkage parts, which in the closed state of the convertible top are usually arranged parallel, and along the border beneath the solid shell parts, in link channels, remain visible to the passengers in the vehicle. Already known solutions for covering the linkage parts by means of brush strips or rigid flaps are either inadequate from an aesthetic point of view or complex and costly to produce.

German Patent Document DE 40 31 270 C1 describes means for attaching an inside roof lining of a convertible top with a linkage and a flexible outer covering, pulling means which are guided on moveable linkage parts being used to tension the inside roof lining during a closing movement of the convertible top and, conversely, to release the same at the beginning of an opening movement of the convertible top. Such an arrangement does not provide any solution for the problems which arise specifically in the case of hard-shell tops, and are brought about by linkage parts pivoting to a large extent relative to the hard roof-shell parts.

SUMMARY OF THE INVENTION

An object of the present invention is to provide a convertible-vehicle top in the case of which the linkage parts can be covered easily and nevertheless effectively in the direction of the vehicle interior.

A top for a convertible vehicle according to the invention comprises a rigid, moveable roof part with an outer surface and an inner surface, a linkage, it being possible for the linkage to be moved in relation to the roof part during an opening movement of the convertible top, and a cover which is designed as a flexible, sheet-like element, said linkage, in a closed state of the convertible top, being arranged between the outer surface of the roof part and the cover, it being possible for the cover to be moved away from the roof part by the opening movement of the convertible top, in order to release a space for movement of the linkage.

It is advantageous here for the cover to be designed as a flexible, sheet-like element, which covers the linkage in a closed state of the convertible top. This makes it possible, in a cost-effective manner, for the cover to be adapted, in respect of color and surface structure, to the rest of the inner surface of the roof part. In particular, it is possible for the sheet-like element to consist of the same material as the inner surface of the roof part. In a preferred embodiment of a convertible top according to the invention, the cover can be tensioned via a pulling device, the pulling device being secured on the cover at one end. This ensures that the cover is positioned in a tensioned manner even over a long service life.

It is particularly preferred for the pulling device to be connected to the linkage and guided on the roof part, with the result that, in a final phase of a closing movement of the convertible top, the cover is tensioned by the relative movement of the linkage and the roof part.

It is particularly preferred for the cover to have a border region, the border region being secured, at least in certain sections, on the roof part. This results in the covering element being mounted, at least in part, in a manner which allows a particularly unobtrusive transition to the inner surface of the roof part.

The cover is preferably designed essentially in a strip-like manner and, in the closed state of the convertible top, is arranged in a lateral border region of the roof part. The strip-like design and lateral arrangement minimize any adverse effects to the visual impression given by the inside of the convertible top.

The cover is preferably backed with a stiffening device at least over part of its surface. This allows linkage parts to be covered reliably, and in an aesthetically pleasing manner, even in regions of the convertible top in which relatively large surface areas are to be covered over, in particular in regions of the C-pillar of a rear roof part.

A second roof part is particularly preferably provided, the cover being secured, at least in sections, on the second roof part. In particular in cases where the roof part and the second roof part are pivoted in relation to one another, for example by means of parallel pivoting, over a large area during the opening movement of the convertible top, this results in a particularly effective possibility for moving the cover away from the linkage.

A third roof part is particularly preferably provided, a second cover, which is secured, at least in certain sections, on the third roof part and, at least in certain sections, on the second roof part, being provided, and a second linkage, in the closed state of the convertible top, being arranged between the third roof part and the second covering element. It is thus possible, by using a plurality of cover which, following the same inventive principle, each cover over a linkage on one of the roof parts in the closed state of the convertible top, to produce even a complex, multi-part hard-shell folding top without linkage parts remaining visible anywhere to the vehicle occupants when the convertible top is in the closed state. Since it is generally the case with such multi-part convertible tops that all the linkage parts are arranged in each case in the lateral border region of the convertible top, it is also possible for the plurality of covering elements to be visually combined with decorative seams provided on inner surfaces of roof parts, such that, in the lateral border regions of the closed convertible top, essentially a continuous, seam-like line is visible to the vehicle occupants, only sub-regions of the strip-form border region being formed as moveable cover between the line and the lateral roof edge.

As an alternative to the cover being secured on an adjacent roof part, securing may also take place directly on the linkage, for example by means of a retaining plate which is secured on a link and has a width corresponding to the cover.

It is preferable for the roof part, in the closed state of the convertible top, to be arranged in front of the second roof part, as seen in the direction of travel, and for the second roof part, in the closed state of the convertible top, to be arranged in front of the third roof part, as seen in the direction of travel, it being possible for the roof part to be pivoted over the second roof part during the opening movement of the convertible top and for the third roof part to be pivoted over the roof part and over the second roof part during the opening movement of the convertible top. In particular, the linkage here is part of a four-bar mechanism, the roof part being secured on a connecting rod of the four-bar mechanism and the linkage comprising a first link and a second link of the four-bar mechanism. This provides a convertible top according to the invention which, on the one hand, is particularly advantageous in respect of its opening movement and stowage possibilities and, on the other hand, on account of the flexible covering of the linkage parts according to the invention, does not have any of the disadvantages associated with such a three-part hard-shell folding top from the prior art.

Further advantages and features of the invention can be gathered from the exemplary embodiment outlined hereinbelow and from the claims.

BRIEF DESCRIPTION OF THE DRAWINGS

A preferred exemplary embodiment of a convertible top according to the invention is described hereinbelow and explained in more detail with reference to the attached drawings.

FIG. 7 shows a cross section through the convertible top from FIGS. 4 and 5, the cross section being taken along section line B—B.

DETAILED DESCRIPTION OF A PREFERRED EMBODIMENT

Figure 1:
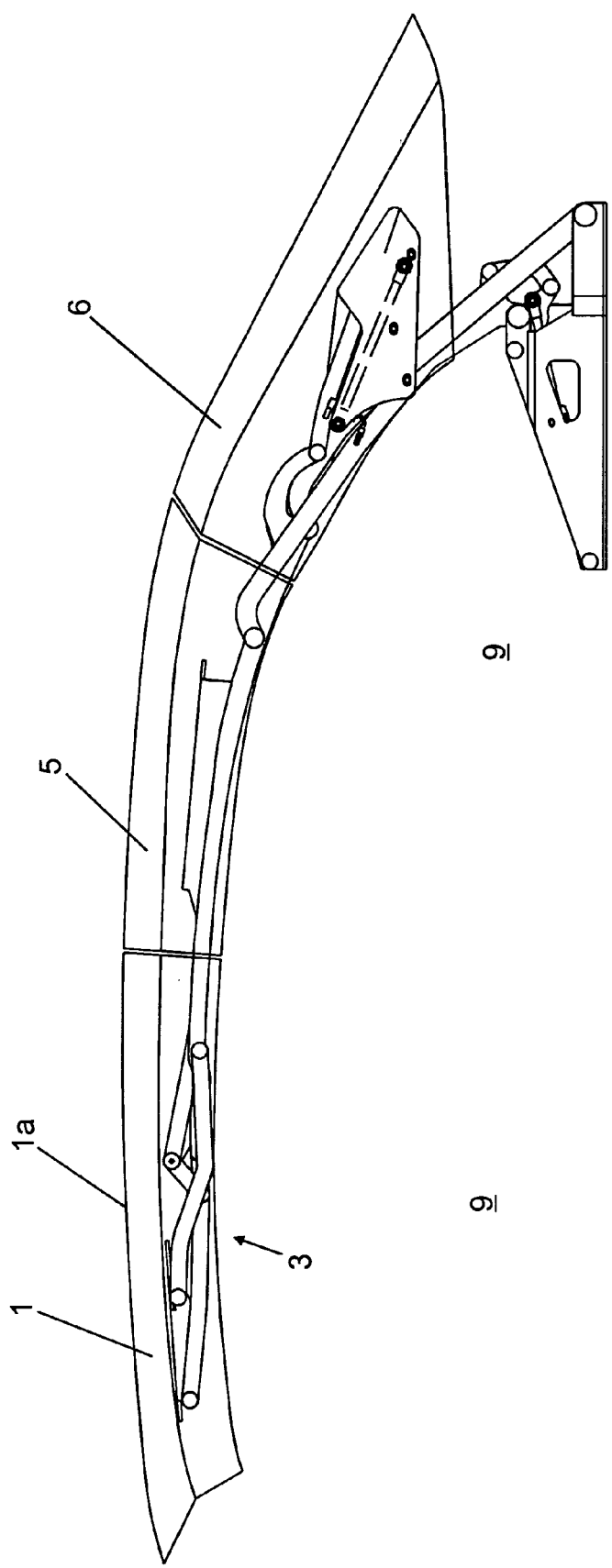
FIG. 1 shows a schematic side view of a convertible top according to the invention in a closed state.
Figure 4:
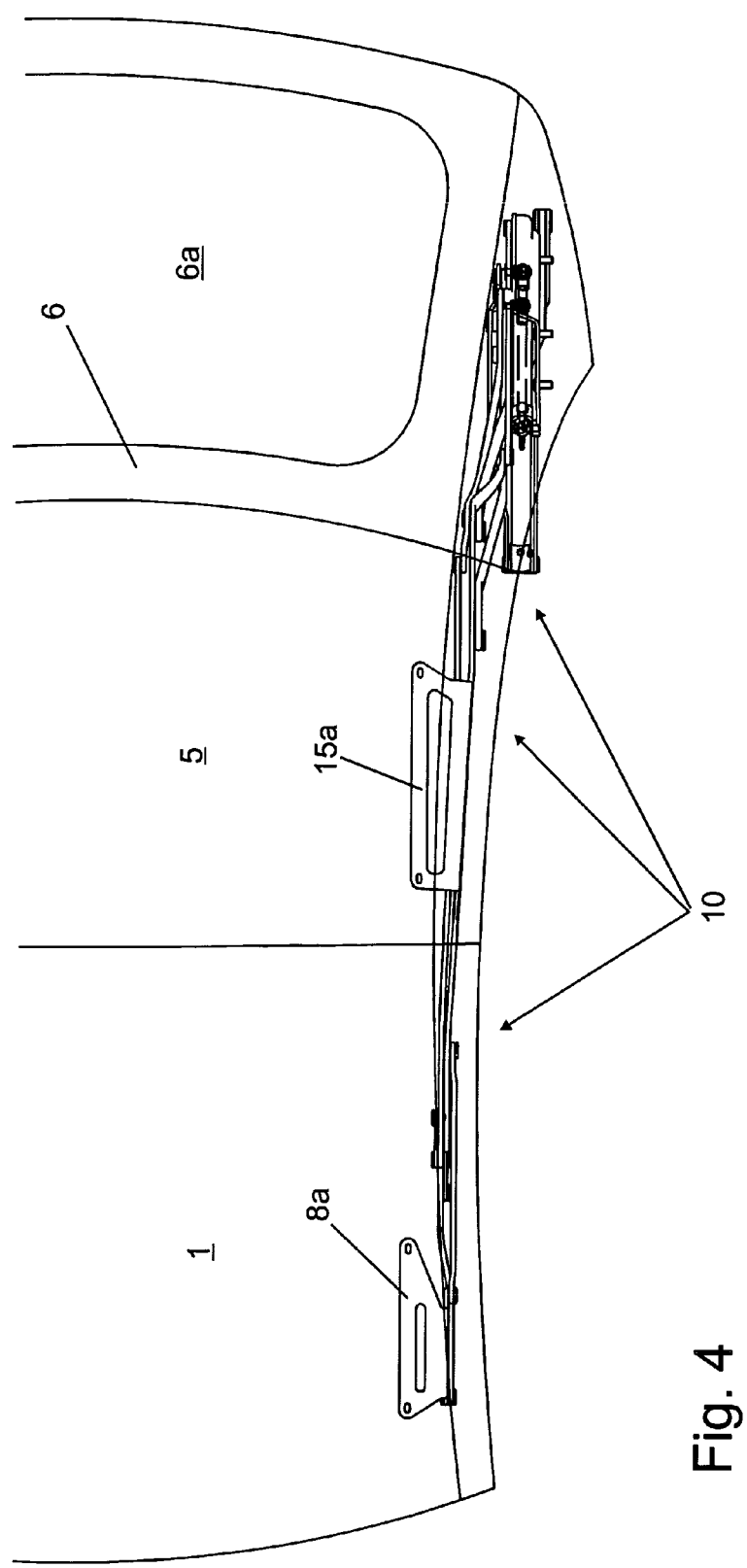
FIG. 4 shows the convertible top from FIG. 1 in a schematic partial plan view from above, a laterally arranged convertible-top linkage being visible.

The convertible top according to the invention which is shown in FIG. 1 comprises a front roof part 1, a central roof part 5 and a rear roof part 6, these each being designed as solid shell parts and, in the closed state of the convertible top, together covering over a passenger region 9 of the vehicle. The third, rear roof part 6 comprises C-pillars and a solid rear window 6a (see FIG. 4).

In the closed state of the convertible top, a convertible-top linkage 10 (see FIG. 4), to which the three roof parts 1, 5, 6 are each fixed, is arranged as a compact string in each case in the lateral roof-edge region.

Figure 2:
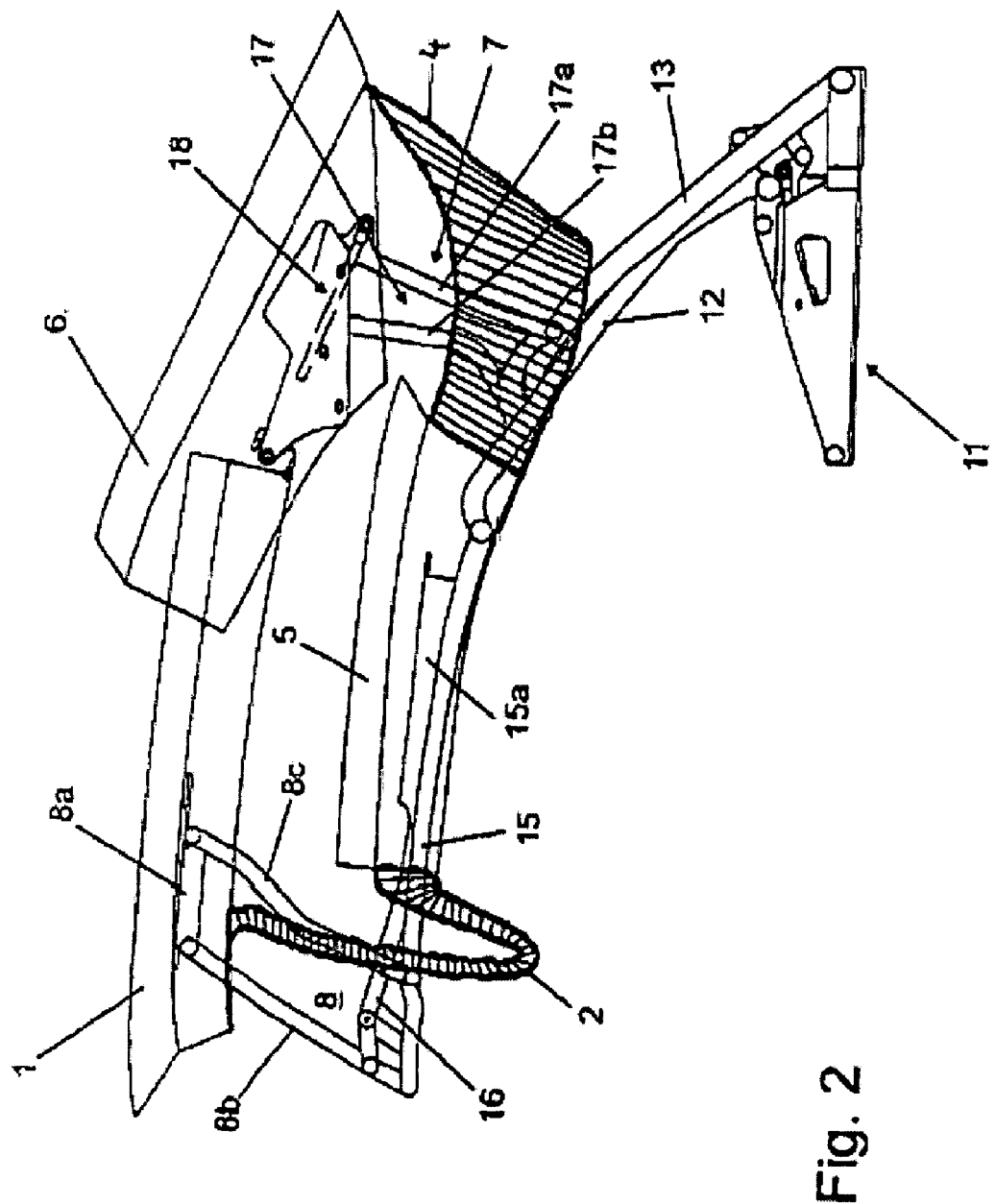
FIG. 2 shows the convertible top from FIG. 1 in a first step of an opening movement.
Figure 3:
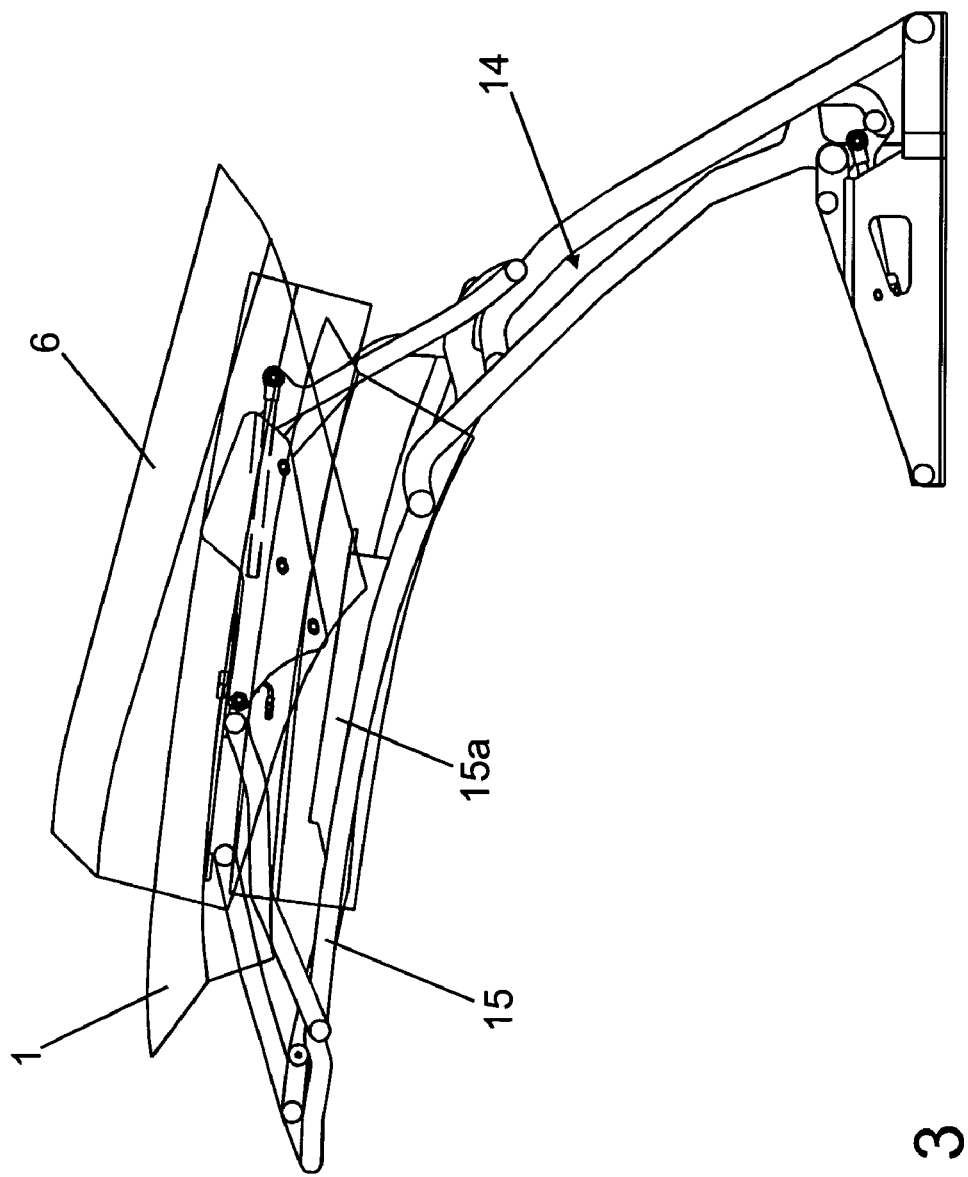
FIG. 3 shows the convertible top from FIG. 1 in a second step of an opening movement.

The convertible-top linkage 10 is shown in detail in particular by way of the illustration of the convertible top in partially open positions (FIGS. 2 and 3). Extending from a bodywork-mounted main-bearing unit 11 are two main links 12, 13, which form part of a main four-bar mechanism 14. The connecting rod of the main four-bar mechanism 14 is formed by a central link 15, on which the second, central roof part 5 is secured by means of a mount 15a. The first, front roof part 1 is secured in a similar manner on a mount 8a which, at the same time, forms the connecting rod of a front four-bar mechanism 8. The front four-bar mechanism 8 comprises two links 8b, 8c, which each are articulated on the central link 15, which thus forms a base rod of the front four-bar mechanism 8. The two links 8b, 8c of the front four-bar mechanism 8 together form a fedassembly linkage 3, which is articulated on the front roof part 1, on the vehicle-interior side, and is pivoted relative to the front roof part 1 during an opening movement of the convertible top.

The pivoting takes place in a positively controlled manner by a central control link 16, which connects the main four-bar mechanism 14 to a rear four-bar mechanism 17. The rear roof part 6 is connected to the central link 15 by means of the rear four-bar mechanism 17, it being possible for the rear roof part 6 to be pivoted essentially parallel over the central roof part 5 by way of the four-bar mechanism 17 being pivoted in a driven manner by means of a dedicated drive device 18 (see figures 2 and 3). In a manner analogous to the linkage 3, links 17a, 17b of the rear four-bar mechanism 17 form a second linkage 7, which, on the one hand, is connected in an articulated manner to the rear roof part 6 and, on the other hand, is pivoted relative to the rear roof part 6 during an opening movement of the convertible top.

In respect of a lining or covering of linkage parts in the closed state of the convertible top, it should be noted, in particular, that, as far as the rear roof part 6 is concerned, it is also the case that the main links 12, 13, in the closed state of the convertible top, are arranged in a lateral roof-edge region, in particular the C-pillar region, of the rear roof part 6, and that the rear roof part 6 is moved away from the main links 12, 13 during the opening movement of the convertible top (see FIGS. 1 and 2). In contrast, the lateral roof-edge region of the central roof part 5 only contains parts of the convertible-top linkage which are not moved away from this region during the opening movement of the convertible top. In the exemplary embodiment shown, the problem of covering linkage parts in the closed state of the convertible top thus arises essentially for the front roof part 1 and for the rear roof part 6.

Figure 5:
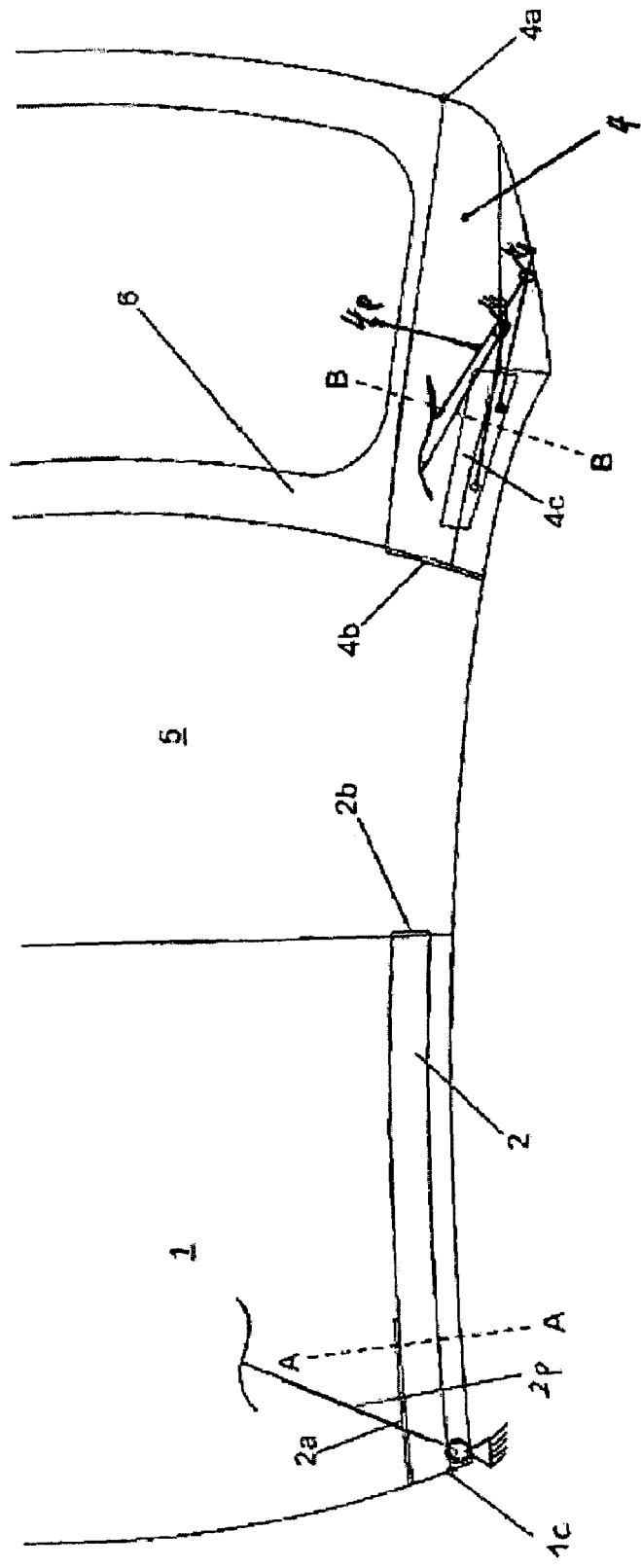
FIG. 5 shows the convertible top from FIG. 4, the convertible-top linkage having been omitted and two covering elements according to the invention being illustrated.
Figure 6:
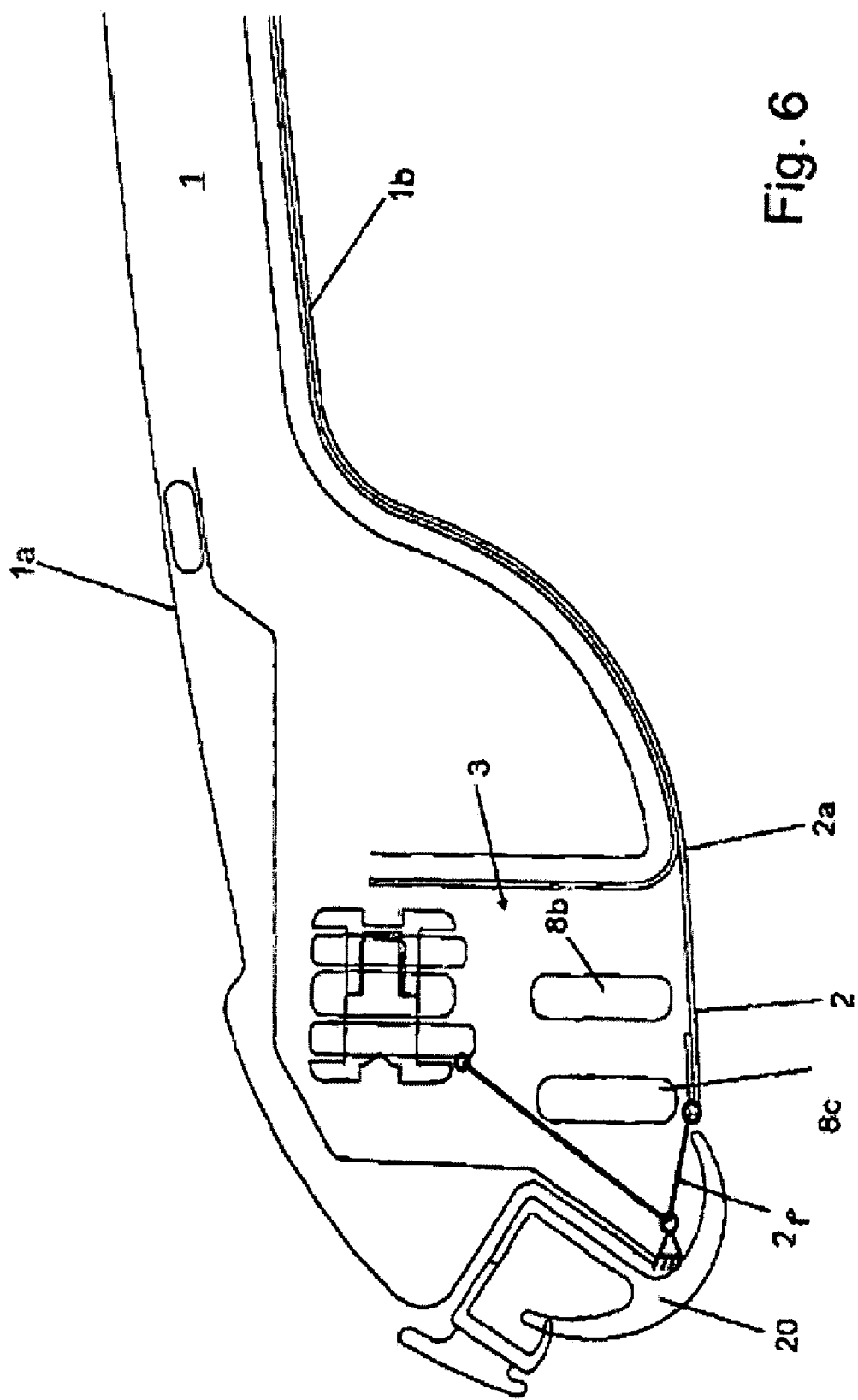
FIG. 6 shows a cross section through part of the convertible top from FIGS. 4 and 5, the cross section being taken along section line A—A.

FIG. 5 illustrates a first covering element 2, which is assigned to the front roof part 1, and a second covering element 4, which is assigned to the rear roof part 6. The covering element 2 is additionally illustrated schematically by means of a dashed line in FIG. 2, whereas the second covering element 4 is not shown in FIG. 2. The covering element 2 has a border region 2a as part of its border, in which it is secured on the roof part 1 by means of a conventional fastening method, for example sewing or adhesive bonding. As the section through the roof part 1 in FIG. 6 shows, this securing of the border region 2a directly adjoins an inner surface 1b of the roof part 1. It is preferable here for the inner surface 1b and the cover 2 to consist of the same, usually textile material. FIG. 6 additionally shows that the linkage 3, in the closed state of the convertible top, is arranged between the cover 2 and an outer surface 1a of the roof part 1 and is thus completely covered.

The strip-like cover 2 is additionally secured, in a narrow end region 2b, on the second, central roof part 5. A third mount for the cover is provided via a pulling device which, at one end, is connected to the cover and is guided via a guide 1c, in particular an eyelet, provided on the roof part 1. The other end of the pulling device is secured on the linkage 3, with the result that the movement of the linkage relative to the roof part 1 can be utilized for bracing the cover 2 in a final phase of a closing movement of the convertible top. The pulling device may be designed as a cable or band. Preferably, the pulling device includes an elastic material and/or is connected to a spring or similar device in order to load the cover by an elastic force. It is likewise conceivable for the pulling device to be configured as a rigid Bowden cable, by means of which it is also possible to transmit shearing forces for moving the cover away early at the beginning of an opening movement of the convertible top.

In the region between the border region 2a and the end region 2b, the cover 2 is an essentially freely suspended, braced strip, with the result that, when the roof part 1 is pivoted over the second roof part 5, the cover 2 is relieved of tensioning and, ultimately, hangs downward (see FIG. 2).

The second cover 4 differs from a straightforward strip form insofar as it has the task of covering over the inner C-pillar region of the convertible top. The second cover 4 has a front region 4b by means of which, in a manner analogous to the cover 2, it is secured on the second, central roof part 5. It is further secured, in essentially punctiform fashion, in a border region 4a, which is provided essentially only at one corner of the second cover 4. In this border region 4a, the second cover 4 is secured on the third, rear roof part 6.

The second cover 4 is secured at a third location, in a manner analogous to the cover 2, by a pulling device which is connected, at one end, to the second cover 4 and, at its other end, to the second linkage 7, with the result that movement of the second linkage 7 can be utilized for bracing the second cover in a final phase of a closing movement of the convertible top.

The second cover 4 additionally has a stiffening device 4c, which is designed as a plastic shell connected to the otherwise flexible cover 4. This particularly advantageously ensures that the C-pillar region is covered by the second cover 4, this covering being more complex and extending over a larger surface area than the covering provided by the cover 2.

That sectional view through the third, rear roof part 6 which is shown in figure 7 illustrates that the linkage 7 and other parts such as the main links 12, 13, in the closed state of the convertible top, are arranged between an outer surface 6b of the third roof part 6 and the second cover 4. The second cover 4 is pulled by the pulling device, in particular in the region of its stiffening device 4c, against a stop surface 19, which is designed as an angled element. It also stops against one of the main links 13, with the result that the second cover 4 is positioned in a particularly reliable manner.

In a manner analogous to the cover 2, the second cover 4 also adjoins an inner surface 6c of the third roof part 6 in a flush manner and in a single plane, this inner surface, in the present case (see FIG. 7), being the interior surface of a frame of a solid rear window 6a integrated in the third roof part.

The covering provided by the cover 2, 4 around the roof border, as can be seen from the sectional drawings in figures 6 and 7, generally directly adjoins sealing profiles of the roof-part edges.

It is advantageously possible for the free border regions of the cover 2, 4 which can be moved relative to the roof parts 1, 3, in the closed state of the convertible top, to butt lightly against seams and/or profiled edges of the respectively opposite regions of the roof parts 1, 3, this preventing movement, for example slight flapping, of the cover during travel.

What is claimed is:

1. A top for a convertible vehicle, comprising
a rigid moveable roof part with an outer surface and an inner surface;
a cover including a flexible sheet-like element; and
a linkage, to which the roof part is fixed, disposed between the outer surface of the roof part and the cover in a closed state of the convertible top, the linkage being moveable relative to the roof part during an opening movement of the convertible top, wherein the cover is moveable away from the roof part during the opening movement of the convertible top so as to create a space for the linkage.

2. The convertible top as recited in claim 1, wherein the cover includes a lateral border region, at least a portion of the border region being secured to the roof part.

3. The convertible top as recited in claim 1, wherein the cover is includes a strip of material.

4. The convertible top as recited in claim 1, wherein the cover is disposed at a lateral border region of the roof part in the closed state of the convertible top.

5. The convertible top as recited in claim 1, wherein the cover includes a stiffening device disposed over at least a portion of a surface of the cover.

6. The convertible top as recited in claim 1, wherein the cover is provided separately from an inner surface of the roof part.

7. A top for a convertible vehicle, comprising
a rigid moveable roof part with an outer surface and an inner surface;
a cover including a flexible sheet-like element;
a linkage disposed between the outer surface of the roof part and the cover in a closed state of the convertible top, the linkage being moveable relative, to the roof part during an opening movement of the convertible top, wherein the cover is moveable away from the roof part during the opening movement of the convertible top so as to create a space for the linkage and a pulling device having a first end connected to the cover and configured to tension the cover.

8. The convertible top as recited in claim 7, wherein the pulling device has a second end connected to the linkage.

9. The convertible top as recited in claim 7, wherein the pulling device is guided on the roof part.

10. A top for a convertible vehicle, comprising
a rigid moveable roof part with an outer surface and an inner surface;
a cover including a flexible sheet-like element;
a linkage disposed between the outer surface of the roof part and the cover in a closed state of the convertible top, the linkage being moveable relative to the roof part during an opening movement of the convertible top, wherein the cover is moveable away from the roof part during the opening movement of the convertible top so as to create a space for the linkage;
a second roof part and wherein the cover is at least partially secured to the second roof part;
a third roof part;
a second cover at least partially secured on the third roof part and the second roof part; and
a second linkage disposed between the third roof part and the second cover in the closed state of the convertible top.

11. The convertible top as recited in claim 10, wherein, in the closed state of the convertible top, the roof part is disposed in front of the second roof part and the second roof part is disposed in front of the third roof part with respect to a travel direction of the vehicle.

12. The convertible top as recited in claim 11, wherein during the opening of the convertible top, the roof part is moveable to a position above the second roof part and the third roof part is moveable to a position above the roof part and the second roof part.

13. A top for a convertible vehicle, comprising
a rigid moveable roof part with an outer surface and an inner surface;
a cover including a flexible sheet-like element;
a linkage disposed between the outer surface of the roof part and the cover in a closed state of the convertible top, the linkage being moveable relative to the roof part during an opening movement of the convertible top, wherein the cover is moveable away from the roof part during the opening movement of the convertible top so as to create a space for the linkage, the linkage is included in a four-bar mechanism having a connecting rod and wherein the roof part is secured on the connecting rod.

14. The convertible top as recited in claim 13, wherein the linkage includes a first link and a second link of the four-bar mechanism.

* * * * *

UNITED STATES PATENT AND TRADEMARK OFFICE
CERTIFICATE OF CORRECTION

PATENT NO. : 7,004,531 B2  Page 1 of 1
APPLICATION NO. : 10/650576
DATED : February 28, 2006
INVENTOR(S) : Klaus Obendiek It is certified that error appears in the above-identified patent and that said Letters Patent is hereby corrected as shown below:

Column 5, lines 63 and 64 should read "The convertible top as recited in claim 1, wherein the cover includes a strip of material." instead of "The convertible top as recited in claim 1, wherein the cover is includes a strip of material."

Column 3, line 64 should read "four-bar mechanism 8 together form a linkage" instead of "four-bar mechanism 8 together form a fedassembly linkage".

Column 5, line 38 should read "6 and 7, generally directly adjoins sealing profiles 20 of the" instead of "6 and 7, generally directly adjoins sealing profiles of the".

Signed and Sealed this

Seventeenth Day of October, 2006

JON W. DUDAS
*Director of the United States Patent and Trademark Office*